(12) United States Patent
Blanc et al.

(10) Patent No.: US 6,557,458 B1
(45) Date of Patent: May 6, 2003

(54) DEVICE AND METHOD FOR CONTROLLING THE CLOSING AND OPENING OF AN EXTRACTION CHAMBER OF A COFFEE MAKER

(75) Inventors: Jean-Pierre Blanc, Nice (FR); Christian Ferrier, Nice (FR)

(73) Assignee: Compagnie Mediterraneenne des Cafes, Carros (FR)

( * ) Notice: Subject to any disclaimer, the term of this patent is extended or adjusted under 35 U.S.C. 154(b) by 0 days.

(21) Appl. No.: 09/959,487

(22) PCT Filed: Apr. 13, 2000

(86) PCT No.: PCT/FR00/00959
§ 371 (c)(1),
(2), (4) Date: Oct. 29, 2001

(87) PCT Pub. No.: WO00/64318
PCT Pub. Date: Nov. 2, 2000

(30) Foreign Application Priority Data

Apr. 27, 1999 (FR) ............................................. 99 05433

(51) Int. Cl.[7] ............................................... A47J 31/40
(52) U.S. Cl. ..................... 99/280; 99/289 R; 99/295; 99/30 P
(58) Field of Search ............................ 99/280, 289 R, 99/289 P, 289 T, 289 D, 295, 302 P, 283; 426/433

(56) References Cited

U.S. PATENT DOCUMENTS 4,484,515 A * 11/1984 Illy .......................... 99/283 X

OTHER PUBLICATIONS

WO 95/17121; Jun. 29, 1995, Blanc et al.*
WO 94/030092; Feb. 17, 1994, Wayne.*

* cited by examiner

Primary Examiner—Reginald L. Alexander
(74) Attorney, Agent, or Firm—Young & Thompson

(57) ABSTRACT

A control device for the closing and opening of the extraction chamber (5) of a coffeemaking machine of the espresso type. The extraction chamber (5) comprises two parts (3, 4) movable relative to each other by an electric motor (6) to open or close the extraction chamber (5). The device comprises:

elements for measuring the intensity of the supply current of the motor (6) at least during the closing phase of the extraction chamber (5);

elements for detecting a drop in the derivative relative to the current supply time below a predetermined threshold, permitting detecting the optimum closed position for the extraction chamber (5), so as to stop the movement of the movable parts (3, 4) when this position is reached.

16 Claims, 3 Drawing Sheets

DEVICE AND METHOD FOR CONTROLLING THE CLOSING AND OPENING OF AN EXTRACTION CHAMBER OF A COFFEE MAKER

The present invention first of all relates to a device for controlling the closing and opening of the extraction chamber of a coffeemaking machine.

The invention also relates to a process for the control of the closing of the extraction chamber.

This device and this process find particular use in coffeemaking machines of the espresso type for domestic or professional use.

Essentially, the coffeemaking machines in question are machines in which the extraction chamber comprises two portions movable relative to each other. This movement is provided by an electric motor to open or close the extraction chamber.

It should be remembered that the extraction chamber delimits an internal volume adapted to receive a dose of ground coffee from which will be extracted the coffee beverage.

A particular application will consist in using the present invention in coffeemaking machines adapted to receive prepackaged doses of ground coffee.

These prepackaged doses of ground coffee will hereinafter be called small doses.

According to the present state of the art, it is necessary to operate different phases of opening and closing the extraction chamber to permit the operation of the coffeemaking machine.

Thus, in a first instance, the ground coffee must be introduced into the extraction chamber, which requires its opening.

Then, before starting forced steeping, the extraction chamber must be closed in a sealed manner.

At present, the closed position of the extraction chamber is detected by the bias of a position detector placed on the motor member or on a movable element whose position reveals the closing of the extraction chamber.

It must be noted that this type of closure detection has various drawbacks.

In the first place, there is no adaptation of the detection to varying possible dimensions of the pieces constituting the machine.

Thus, in the case of play, dimensional variations due to the tolerances of production, or the like, the optimum closed position of the extraction chamber can change without this being detected by a position detector.

Moreover, in the particular case of the use of small doses, the latter can also have dimensional variations.

In particular, certain small doses have a rigid periphery permitting reinforcing the small dose and taking part in sealing of the extraction chamber during extraction of the coffee.

The rigid periphery of such small doses can have great dimensional variations.

As a result, according to the present state of the art, the locking of the extraction chamber cannot be optimum.

Thus, the detection of closure by a position detector can be triggered too soon, which stops the motor prematurely.

Moreover, the end of locking can be delayed (triggering the position detector after the optimum closure position), which may lead to wear on the pieces, bad locking or else a useless overconsumption of electrical energy.

The present invention has for its object to overcome the drawbacks of the present state of the art as to this.

One of its first objects is to permit a perfect positioning of the two movable parts comprising the extraction chamber in the closed position.

Thus, the alignment of the edges of the movable portions will be an optimum, thereby ensuring good sealing and avoiding any wear.

The locking must itself also be effective to avoid any loss and to use all the power of the motor for closing.

Moreover, perfect stopping of the motor will permit a drop in the consumption of energy supplied to the motor.

Finally, even in the case of large dimensional variations of the pieces or of the small doses, an immediate adaptation of the device will be effectuated.

Moreover, the invention also ensures relocking of the chamber in the course of steeping to maintain the optimim seal throughout the cycle.

The present invention relates to a device for controlling the closing and opening of the extraction chamber of a coffeemaking machine of the espresso type, said extraction chamber comprising two portions movable relative to each other by an electric motor to open or close the extraction chamber, characterized by the fact that it has:

- means for measuring the intensity of the current supplied to the motor at least during the closing phase of the extraction chamber;
- means for detecting a drop in the derivative relative to time, of the supply current, below a predetermined threshold, permitting detecting the optimum closed position for the extraction chamber, so as to stop the movement of the movable parts when this position is reached.

This device can have different modes of embodiment, among which are the following:

the measuring means have:
- a measuring electric resistance, at the terminals of which the voltage $V_R$ is proportional to the value of the current supply to the motor,
- an assembly with a non-inverting operational amplifier permitting amplifying the voltage $V_R$ at the terminals of the measuring resistance, so as to obtain an electrical quantity reflecting the supply current for use by the detection means.

It comprises an analog-digital converter for the conversion of the electrical supply current or of the electrical quantity reflecting it, into a digital quantity.

The detection means comprise a microprocessor with an inlet terminal which receives the digital value reflecting the supply current, and a computation program for the derivative relative to time of said current or of said electrical quantity.

The detection means comprise at least one control output of the electric motor according to the value of the derivative relative to time.

It comprises a position detector permitting detecting the open position of the extraction chamber according to the angular position of the motor or of the transmission gearing.

It comprises at least one detector for the presence of a small dose.

It comprises a detector detecting the presence of a small dose in upper position and a detector detecting the presence of a small dose in a lower position.

It comprises a position detector and a solid plate for transmission gearing, said plate being divided into two half discs of different radii and the plate is positioned on the gearing such that the transition fronts between the two half discs pass respectively facing the position detector when the extraction chamber is in the open position and when the extraction chamber is in a maximum closed position.

The invention also relates to a process for the control of the closing of the extraction chamber of a coffeemaking machine of the espresso type, said extraction chamber comprising two portions movable relative to each other by an electric motor to open or close the extraction chamber, said process being adapted to be practiced by the device, characterized by the fact that there is measured, at least during the closing phase of the extraction chamber, the intensity of the current supplying the motor, there is detected a drop in the derivative relative to time, of the supply intensity, below a predetermined threshold, to detect the optimum closed position of the extraction chamber, so as to stop the movement of the movable portions when this position is reached.

This process comprises the following preferred embodiments:

The intensity of the measured supply current is processed so as to obtain a numerical quantity reflecting said intensity.

The drop in the derivative relative to time, of the supply intensity, is detected by carrying out iteratively he following steps:

the value of the numerical quantity is taken at two times separated by a fixed time interval the slope of the straight line passing through the two points defined by their time abscissae and their ordinates of the value of the numerical quantity, is calculated.

The motor is stopped when the slope of the straight line passes below the predetermined threshold for a predetermined number of iterations.

In the course of extraction, there is carried out a supplemental closing movement of the extraction chamber.

The supplemental movement of closing is sequential.

The supplemental closing movement is prolonged until the end of the extraction or until obtaining a maximum closed position of the extraction chamber.

The accompanying drawings are given by way of example and are not limiting. They show a preferred embodiment of the invention. They permit easy comprehension of the invention.

The coffeemaking machines whose extraction chamber 5 comprises two movable portions 3, 4, can have different designs.

Thus, a translatory operation of the movable portions 3, 4 can be carried out to open and close the extraction chamber 5.

Figure 1:
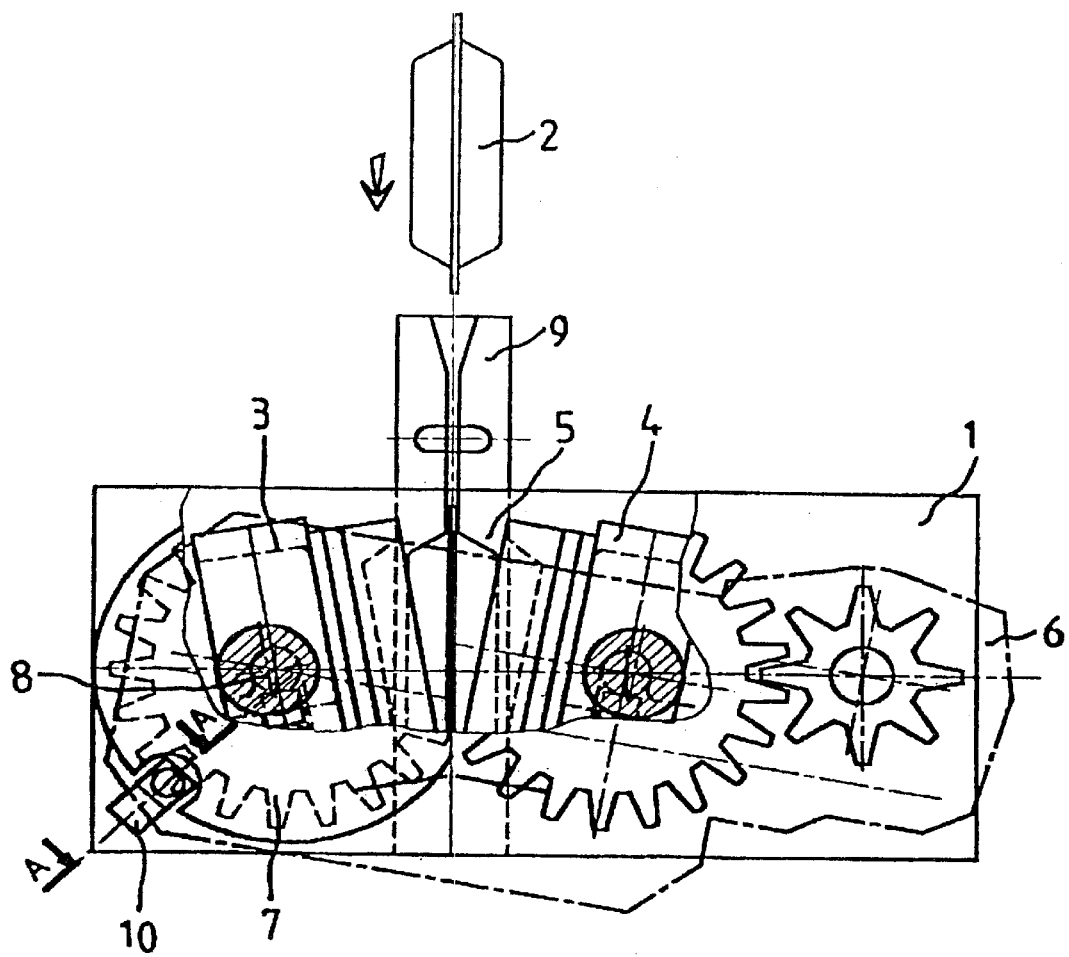
FIG. 1 shows generally an extraction chamber provided with two movable parts, to which may be applied the present device.

FIG. 1 shows another embodiment that is particularly advantageous, in which the movable portions 3, 4 have a freedom of movement in rotation and in translation under the urging of a transverse axle 8 with an eccentric, present on each movable portion 3, 4.

A gear system 7 permits transmitting the power produced by the motor 6, to drive the movable portions 3, 4.

According to this embodiment, the extraction chamber 5 can pass from an open position in the shape of a "V" for the insertion of the dose of ground coffee or of a small dose 2, to a closed position in which the two movable portions 3, 4 come into linear and parallel contact.

The extraction of used coffee grounds or of the used small dose 2 can be carried out by a further rotation of the movable portions 3, 4 forming a tent shape.

It is to be noted that the closed position of the chamber 5 requires high precision for the reasons give above.

However, the opening phases for introduction of a small dose 2 or for removal, do not require such precision.

FIG. 1 shows an extraction assembly according to this operation.

There is also shown in FIG. 1, a small dose 2 comprising a rigid annular periphery.

The device according to the invention has first of all means for measuring the intensity of the supply current to the motor 6.

This measurement will be carried out at least during the closing phase of the extraction chamber 5.

The measuring means according to the invention have the function of recovering the value of the intensity of the current supplied to the motor 6 and if desired to process the supply current to obtain a value directly usable by the detection means.

Thus, the device according to the invention also comprises detection means for a drop in the derivative relative to the time of supply current, below a predetermined threshold.

During passage from the open upper position of the extraction chamber 5 to the closed position permitting forced steeping, the motor 6 will experience a change in its supply current as a function of time.

Thus, in the course of locking the two movable portions 3, 4, one against the other, an excess of power is required in the motor, this excess translating into a large increase in the supply intensity.

When optimum locking is intense, it will be seen that a large drop in the slope of the curve of development of supply current relative to time will be noted.

This lowering of the slope can continue until an obliteration of the derivative, before a descending phase of the supply current takes place.

The present detection means permit detecting the progress of the supply current and above all to disclose the time at which the increase of this current decreases.

The predetermined threshold below which the drop in supply current will be detected, can be fixed at the time of manufacture.

By way of example, there can be provided a detection for a slope less than one or else for a slope equal to zero (canceling of the time derivative of the supply current).

Thanks to the detection of this drop of the supply current below a predetermined threshold, a control can be operated for the motor and essentially it can be stopped in an optimum closed position of the extraction chamber 5.

Figure 3:
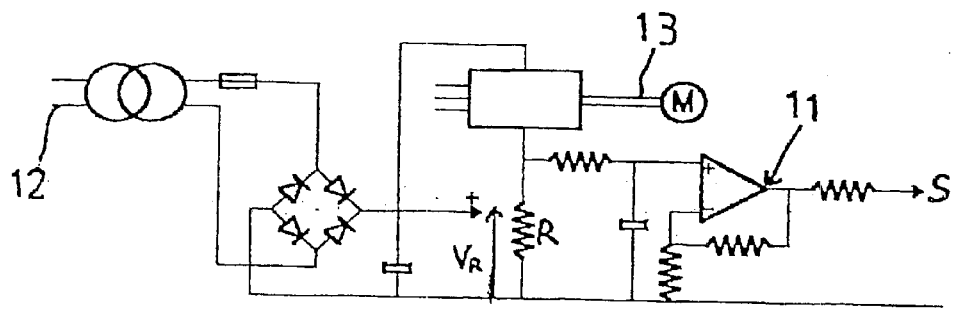
FIG. 3 shows an embodiment of an electronic circuit integrated into the device according to the invention.

According to the embodiment shown in FIG. 3, the measuring means could have an electronic arrangement in which are present:

an electrical measuring resistance shown at R, an assembly with a non-inverting operational amplifier, shown at 11.

The resistance R permits, by measuring the voltage $V_R$ at its terminals, obtaining a voltage proportional to the supply current to the motor 6.

The assembly 11 with an operational amplifier has its own function of amplifying according to a predetermined gain, the voltage value $V_R$ thus obtained.

There is thus produced a reference electrical quantity S in FIG. 3 at the output of the assembly 11, the quantity S reflecting the supply current and being usable by the detection means.

Also indicated in FIG. 3, is the supply input of the motor immediately followed in the illustrated embodiment by a transformer and a diode bridge.

The control of the power of the motor 6 is shown by reference numeral 13.

In a preferred embodiment, the quantity S obtained at the output of the measuring means is subject to analog/digital transformation.

There will be used to do this, an analog-digital converter of known design.

Thus, the electrical quantity S is transformed into a digital quantity adapted to be used by the means located downstream.

Thus, in a preferred embodiment, the detection means comprise a microprocessor of which one input receives the digital quantity thus obtained.

Moreover, the detection means contain a computation program of the derivative relative to time, of the digital value thus obtained, reflecting the supply current to the motor 6.

There can be used a microprocessor of known design.

Once the detection of the drop in the derivative relative to time, of the supply current, has been carried out, the detection means can control the electric motor 6.

Stopping the motor will, in this framework, be carried out as soon as the derivative has fallen below a threshold value that can for example be equal to one or else equal to zero (translating the peak of the curve of intensity relative to time)

In a particular embodiment, the device for controlling the closing and opening of the extraction chamber 5 shown here, will comprise moreover an open position detector of the chamber 5.

Figure 2:
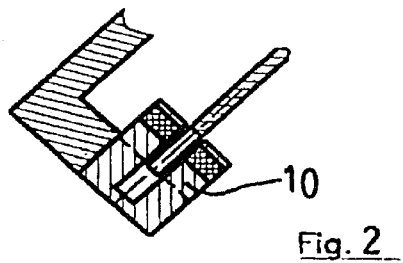
FIG. 2 shows a detail on the line A—A of FIG. 1.

This detector 10 is shown in FIGS. 1 and 2.

In the illustrated embodiment, the detector 10 is located facing one of the gearing 7 transmitting the power of the motor to the movable portions 3, 4.

When a certain angular position of the gearing is reached, the position detector is actuated and permits detecting the open position of the chamber 5.

A detector of known design can be used for the position detection.

There will be described hereafter the steps in the operation of the device according to the invention, and of the process.

In a known manner, the group 1 starts from a position in which the extraction chamber 5 is open. This opening permits the introduction of ground coffee or a small dose 2.

One embodiment is shown in FIG. 1.

Thereafter, the user could manually control the start of the apparatus.

This start gives rise to starting the motor 6 and progressive movement of the movable portions 3, 4, which tend to approach each other.

At the end of a certain time, the movable portions 3, 4 come progressively into contact, which is shown by an increase of the supply current to the motor.

As a result of this phase, an optimum locking will take place, corresponding to reaching maximum power of the motor, as seen by an annulment of the derivative of the supply current or at least by a substantial drop in the slope of the supply current relative to time.

To measure the supply current (by the bias of the measurement means), the time progression of current is the change with time of the current is recovered.

By the bias of the detection means, this development is processed so as to detect a drop in the slope below a predetermined threshold.

Figure 4:
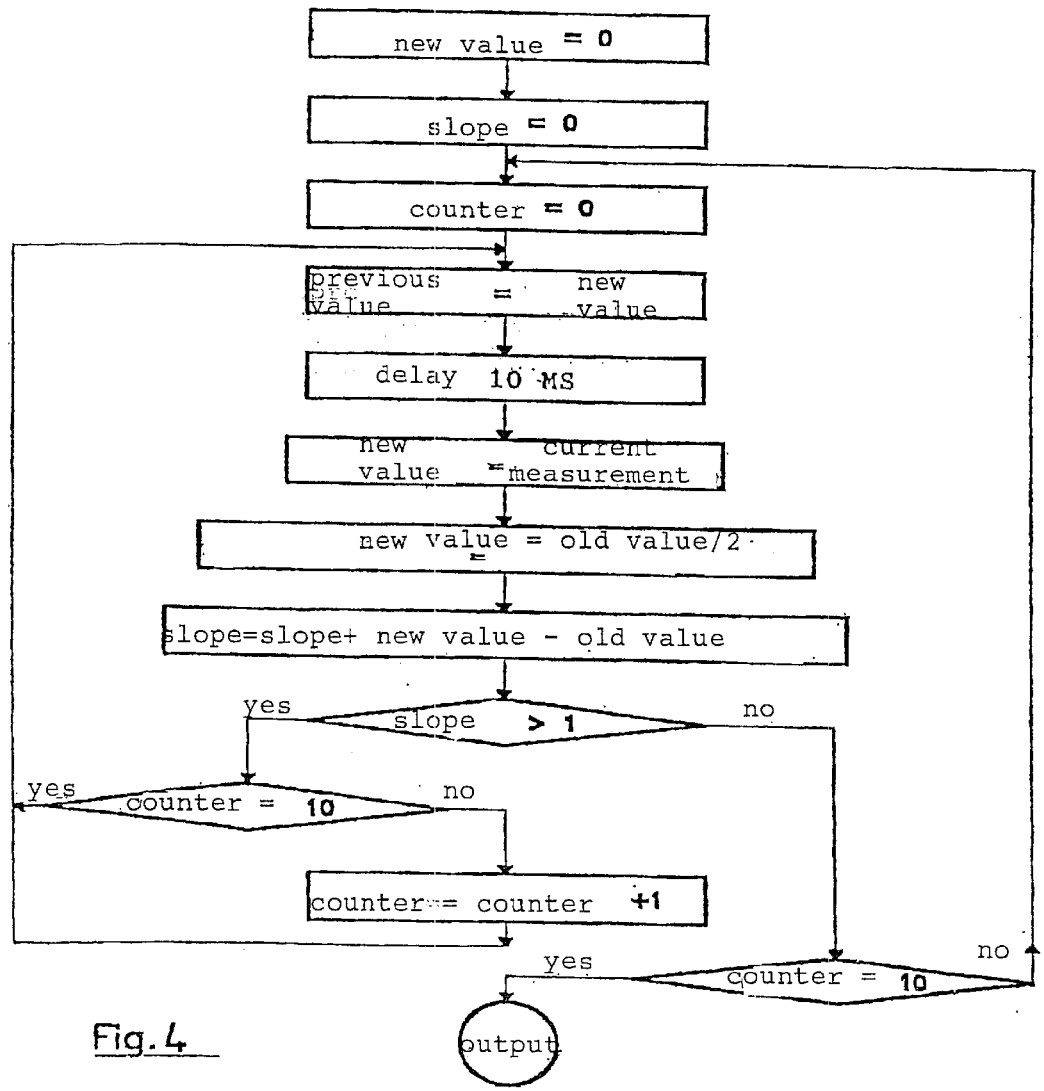
FIG. 4 is a diagram of a series of steps in the practice of the invention.

The steps corresponding to this detection phase are shown in the embodiment of FIG. 4.

These steps are substantially the following:

resetting to zero of the current value and of the slope (restarting before use of the measured supply current values), use of a counter permitting counting the number of iterations of computations that have been carried out.

At the beginning of the cycle, setting the counter to zero, in the framework of a looped iterative calculation, transfer of the last value of the measured supply current (new value) into the so-called previous value, achieved during a certain duration of time.

According to the example, the duration of time is 10 ms.

integration into the detection means, of a new measured value of the supply current, possible corrections by arithmetic means of the new value, computation of the slope of the curve of the supply current as a function of time by using the two memorized values (new value and former value) spaced by a time interval of predetermined length (here 10 ms). If desired, a correction by arithmetic means can be carried out as in the case shown in FIG. 4, if the measured slope is greater than a predetermined threshold (according to the example shown in FIG. 4, the threshold is 1), the iterative computation will be continued.

in the case shown in FIG. 4, there is carried out a predetermined number of iterations during which a slope below the predetermined threshold is detected, so as to ensure continuous and real character of the detected drop.

if no drop is detected below the predetermined threshold, the computation is followed and the iterations detector is reset to zero.

These steps of computation can be carried out in the microprocessor, which comprises the detection means. These computations will be done later than the measurement of the measuring means permitting injecting by means of this detection, the value of the supply current, or a value reflecting the development of this supply current. In particular, a preliminary processing of the intensity of measured current supply, will permit obtaining a numerical size that reflects it.

There will be described hereafter more precisely the embodiment of the invention shown in FIG. 5.

According to this modification, two detectors 15, 16 of the presence of the small dose 2 are provided. They permit detecting the small dose 2 upon its approach to the extraction chamber 5.

Two detectors 15, 16 are used so that they will permit the detection of the positive and accidental presence of two small doses. In this case, an error signal can be generated and displayed.

The user is invited to withdraw the second small dose before beginning production of the beverage.

These detectors can also have the function of detecting whether the small dose is in the operational format.

Figure 5:
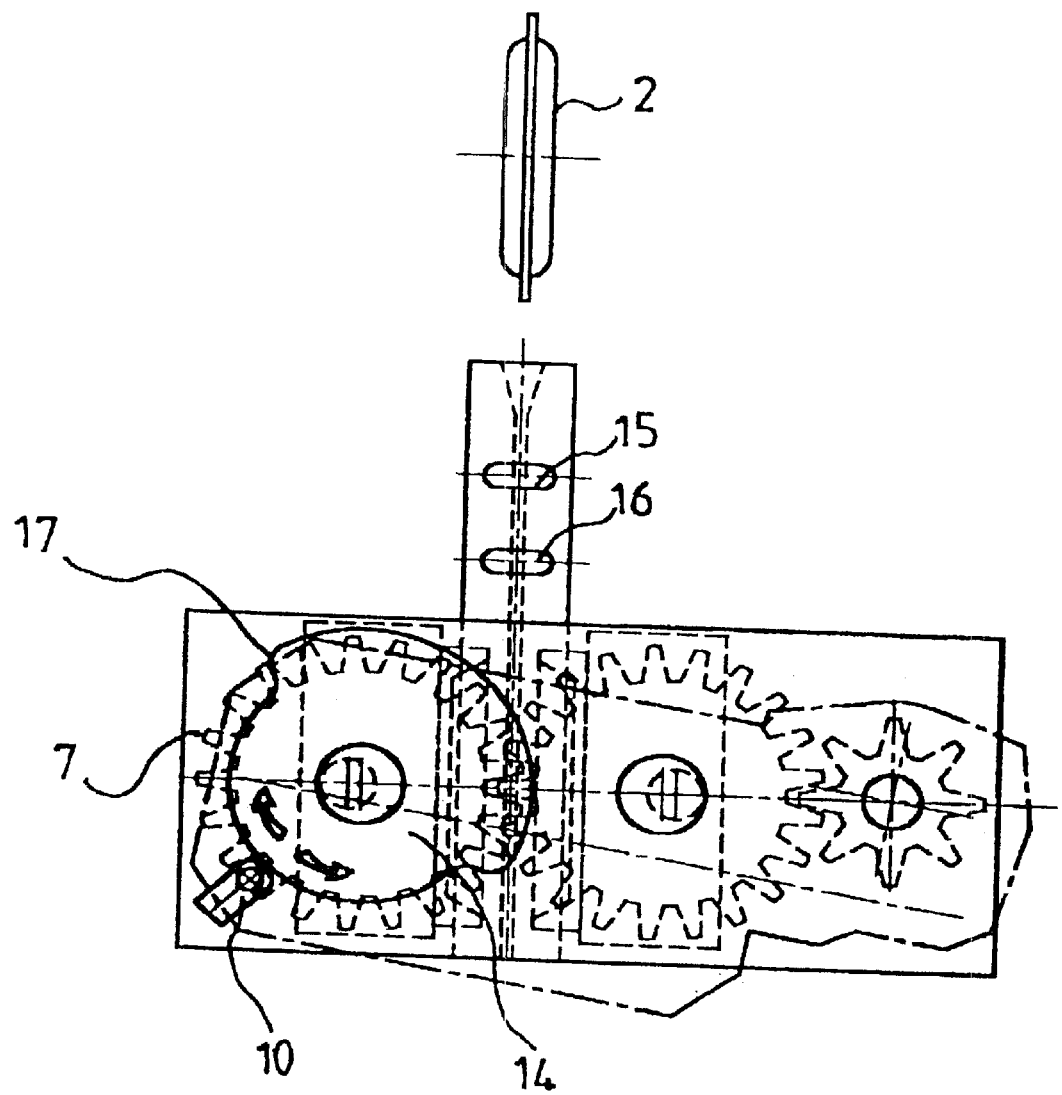
FIG. 5 is an overall view of an extraction chamber in the case of a modification of the invention.

Again in the example of FIG. 5, a modification of detecting the open/closed position of the extraction chamber 5 is shown.

Thus, a detector 10 can be used not only to detect the open position, but also to detect a maximum closed position of the extraction chamber 5.

The closing of the chamber 5 can thus take place until a maximum limit fixed by the detection of the detector 10.

The present invention relates to a desirable solution to detect each of the open/closed positions.

To this end, a plate 14, secured to one of the gearings 7 for transmission of power from the motor to the two movable portions, is provided.

In a preferred embodiment of FIG. 5, the plate 14 is divided into two half discs that differ as to radius. This difference generates two diametrically opposed fronts 17.

According to the invention, the position of the fronts 17 is adjusted such that they correspond to the maximum open and closed positions of the extraction chamber. This adjustment is carried out with relation to the movement of the gearing 7, which is provided in this case to operate one half turn between each of the end positions.

There will be described hereafter a mode of operation of the modification of the device described above.

The loading of the small dose 2 takes place when the chamber 5 is open. The detector 10 is thus in the detection position, because the first front 17 has been reached.

The closing of the chamber 5 is carried out and is stopped when the detection of the maximum threshold occurs.

Steeping then starts to produce the beverage.

In the course of steeping, the jerky and periodic closing movements are used to perfect the closure.

It has thus been noted that locking can take place unfavorably in the course of the steeping cycle, particularly under the influence of the coffee and filter moistener.

The supplemental locking is here provided to overcome this drawback.

This supplemental movement can be limited by the bias of the detector 10 when the second front 17 is reached.

The device thus detects whether the maximum closed position has been obtained and that locking can no longer be improved.

REFERENCES

1. Group
2. Small dose
3. Movable portion
4. Movable portion
5. Extraction chamber
6. Motor
7. Gearing
8. Eccentric axle
9. Guide
10. Detector
11. Assembly with operational amplifier
12. Supply
13. Motor control
14. Disc
15. High position detector
16. Low position detector
17. Front
S. Analog size
R. Electrical resistance
$V_R$. Voltage at the terminals of resistance R

What is claimed is:

1. Device for controlling the closing and opening of the extraction chamber (5) of a coffeemaking machine of the espresso type, said extraction chamber (5) comprising two portions (3, 4) movable relative to each other by an electric motor (6) to open or close the extraction chamber (5), characterized by the fact that it has:

means for measuring the intensity of the supply current to the motor (6) at least during the closing phase of the extraction chamber (5);

means for detecting a drop in the derivative relative to time, of the supply current, below a predetermined threshold, permitting detecting the optimum closed position for the extraction chamber (5), so as to stop the movement of the movable portions (3, 4) when this position is reached.

2. Control device according to claim 1, characterized by the fact that the measuring means have:

an electrical resistance (R) for measurement at the terminals of which the voltage $V_R$ is proportional to the value of the supply current to the motor (6), an assembly (11) with an operational non-inverting amplifier permitting amplifying the voltage $V_R$ at the terminals of the measuring resistance (R), so as to obtain an electrical quantity (S) reflecting the supply current for use by the detection means.

3. Control device according to claim 1, characterized by the fact that it comprises:

an analog-digital converter for conversion of the electrical supply current or of the electrical quantity (S) reflecting it, in digital value.

4. Control device according to claim 3, characterized by the fact that the detection means comprise a microprocessor with an input terminal which receives the numerical quantity reflecting the supply current, and a computation programmed for the derivative relative to time, of said current or of said electrical quantity.

5. Control device according to claim 1, characterized by the fact that the detection means comprise at least one control output of the electric motor (6) according to the value of the derivative relative to time.

6. Control device according to claim 1, characterized by the fact that it comprises a position detector (10) permitting detecting the open position of the extraction chamber (5) according to the angular position of the motor (6) or of transmission gearing (7).

7. Control device according to claim 1, characterized by the fact that it comprises at least one detector (15, 16) for detecting the presence of a small dose (2).

8. Control device according to claim 7, which comprises a detector (15) detecting the presence of a small dose (2) in the upper position and a detector (16) detecting the presence of a small dose (2) in a lower position.

9. Control device according to claim 1, characterized by the fact that it comprises a position detector (10) and a plate (14) secured to a transmission gearing (7), said plate being divided into two half discs of different radii and a plate (14) positioned on the gearing (7) such that the transmission fronts (17) between the two half plates pass respectively facing the position detector (10) when the extraction chamber (5) is in the open position and when the extraction chamber (6) is in maximum closed position.

10. Process for the control of the closing of the extraction chamber (5) of a coffeemaking machine of the espresso type, said extraction chamber (5) comprising two portions (3, 4) movable relative to each other by an electric motor (6) to open or close the extraction chamber (5), said process being adapted to be used by the device according to claim 1, characterized by the fact that there is measured, at least during the closing phase of the extraction chamber (5), the intensity of the supply current to the motor (6), there is detected a drop in the derivative relative to time, of the supply intensity, below a predetermined threshold, to detect the optimum closed position of the extraction chamber (5), so as to stop the movement of the movable portions (3, 4) when this position is reached.

11. Process for the control of the closing of the extraction chamber (5) of a coffeemaking machine of the espresso type, according to claim 10, characterized by the fact that the intensity of the measured supply current is processed so as to obtain a digital quantity reflecting said intensity.

12. Process for the control of the production of the extraction chamber (5) of a coffeemaking machine of the espresso type according to claim 11, characterized by the fact that the drop in the derivative relative to time, of the feed intensity, is detected by iteratively carrying out the following steps:

the value of the digital quantity is taken at two separate times with a fixed time interval the slope of the straight line is calculated, there passes through the two points defined by their temporal abscissae and their ordinates, from the value of the digital quantity.

13. Process for the control of the closing of the extraction chamber (5) of a coffeemaking machine of the espresso type, according to claim 12, characterized by the fact that the motor (6) is stopped when the slope of the straight line passes below the predetermined threshold value for a predetermined number of iterations.

14. Process for the control of the closing of the extraction chamber (5) of a coffeemaking machine of the espresso type, according to claim 10, characterized by the fact that in the course of extraction, there is carried out a supplemental movement of closing the extraction chamber (5).

15. Process for the control of the closing of the extraction chamber (5) of a coffeemaking machine of the espresso type, according to claim 14, characterized by the fact that the supplemental movement of closing is sequential.

16. Process for the control of the closing of the extraction chamber (5) of a coffeemaking machine of the espresso type, according to claim 12, characterized by the fact that the supplemental movement of closure is prolonged to the end of the extraction or the obtaining of a maximum closed position of the extraction chamber (5).

* * * * *